L. W. BUGBEE.
BIFOCAL.
APPLICATION FILED OCT. 26, 1916.
1,221,967.
Patented Apr. 10, 1917.
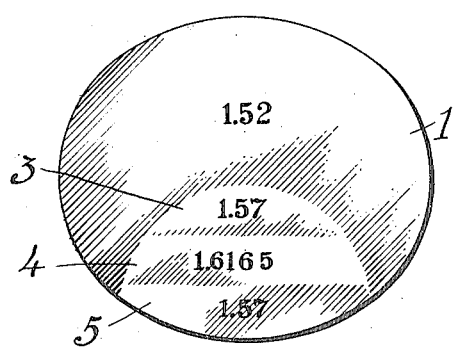
*Fig. I*
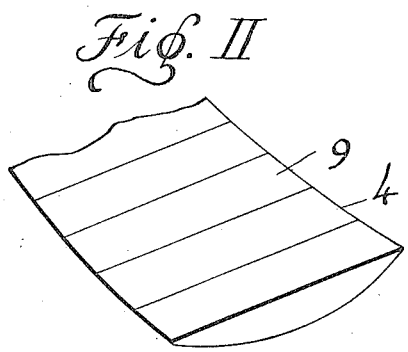
*Fig. II*
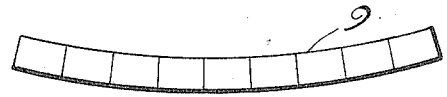
*Fig. III*
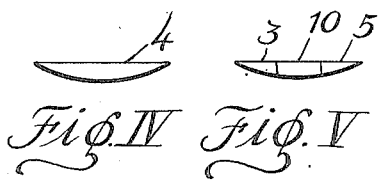
*Fig. IV*  *Fig. V*
*Fig. VI*
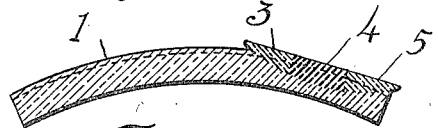
*Fig. VII*
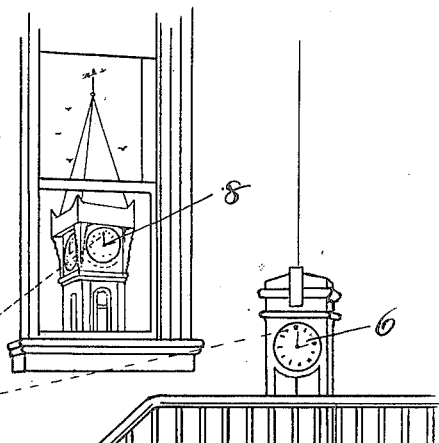
*Fig. VIII*
INVENTOR
LUCIAN W. BUGBEE
BY
H. H. Styll  A. K. Parsons
ATTORNEYS

UNITED STATES PATENT OFFICE.

LUCIAN W. BUGBEE, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

BIFOCAL.

1,221,967. Specification of Letters Patent. Patented Apr. 10, 1917.

Application filed October 26, 1916. Serial No. 127,810.

*To all whom it may concern:*

Be it known that I, LUCIAN W. BUGBEE, a citizen of the United States, residing at Southbridge, in the county of Worcester and State of Massachusetts, have invented certain new and useful Improvements in Bifocals, of which the following is a specification.

My invention relates to improvements in lenses and has particular reference to an improved construction of lens of the bifocal or multifocal type.

One of the leading objects of the present invention is the provision of an improved construction of lens of the fused type which shall embody a plurality of foci to satisfactorily correct the vision of the wearer, as for near, intermediate and distant vision.

A further object of the invention is the provision of an improved construction of multifocal which may be readily and simply formed with a minimum amount of grinding and fusing labor.

A further object of the invention is the provision of an improved lens of this character which shall embody an upper distance portion, an intermediate vision portion, a lower reading portion, and in addition shall provide at the very bottom thereof a segment for intermediate vision, particularly adapted for use in going up and down stairs, getting on and off of trolley cars, or the like.

Other objects and advantages of my improved multifocal lens and new manner of forming the same should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a view of my completed lens with the various indices of the glass composing the same indicated thereon.

Fig. II represents a perspective view of the slab from which one portion of the segment is formed.

Fig. III represents an edge view of the slab indicating the divisions thereon.

Fig. IV represents an end view thereof.

Fig. V represents a sectional view illustrating the cutting of the other portions of the segment.

Fig. VI represents a sectional view of the several parts applied to the major blank in position for fusion thereon.

Fig. VII represents a sectional view through the completed lens.

Fig. VIII is a view illustrating the use of my improved lens.

In the drawings, in which similar characters of reference are employed to denote corresponding parts throughout the several views, the numeral 1 designates the major blank or portion of my improved lens, having formed therein a countersink 2 ordinarily intended for the reception of a single segment.

In connection with my improvement, however, I have shown as fused within the countersink 2 in place of the ordinary single segment a compound segment composed of the upper portion 3, intermediate portion 4 and lower portion 5.

By reference, for example, to Fig. I of the drawing it will be seen that I have, for purposes of this patent, shown the major blank 1 as formed from glass having a refractive index of 1.52, that the portion 3 of the segment has the index 1.57, the portion 4, the index 1.6165, and the lower portion 5, like the portion 3, having the index 1.57, in this manner the portions 3 and 5 when fused in position having the same value or being adapted for intermediate vision work, although it will be understood that the portions 3, 4 and 5 may all be of glass of different indices of refraction, if preferred.

On account, therefore, of the several indices of refraction employed in connection with Fig. I, for example, the lens when fused may be ground with smooth or unbroken surfaces on both sides and the upper portion 1 will provide the usual and ordinary distance lens, the portion 3 an intermediate vision lens adapted for use, as for looking at the clock 6 shown on the stairs in Fig. VIII, the portion 4 providing a portion for near reading work or the like, as for example for looking at the watch 7 shown in Fig. VIII, while the portion 5 again provides an intermediate vision portion enabling the wearer to look down through it to locate the flight of stairs or the like, as shown in Fig. VIII.

This figure is believed to rather clearly bring out the advantages of my improved lens, in that as clearly illustrated in this figure, it is possible by the use of my lens without shifting the head and by merely turning the eye to look through one portion or another of the lens, to look either at the distant clock 8 in the church spire, at the clock located on the stairs adjacent the window through which the church clock is seen, or at the watch in the hand, in order that the three may be compared at a glance to determine whether any one or more of the same are correct, while at the same time the wearer may momentarily glance downward and locate the flight of steps he is preparing to ascend, without any blurring of the vision for any of these purposes.

For best understanding of the preferred method of formation of my improved lens, particular attention is invited to Figs. II to VI inclusive, although it will be understood that this is only one manner in which the same may be formed, since the several parts forming the segment or button to be fused in place could be previously united in block form and then ground to the shape of the button to be fused or the button could be formed in other manners well known to optical workers and not here requiring particular description.

In the form illustrated, however, I have shown in Fig. II a bent cylindrical glass member 9 which is adapted to be split into a plurality of portions 4, as indicated by the cross lines, Figs. II and III, these portions when split from the main body having the side appearance indicated in Fig. IV, curving to substantially a feather edge at each end and dropping downward in the center, thus substantially corresponding on account of the curved cylinder effect of the block from which they were taken to the shape of that portion of the countersink 2 in which the block or portion 4 is to fit.

To form the portions 3 and 5 for the intermediate vision, I preferably form an ordinary substantially circular button or segment, as illustrated in Fig. V, splitting the same to cut out the central portion 10 and leave the edge portions 3 and 5, respectively, the size of the slab 10 removed being substantially the same as the size of the portion 4 of the block 9 which is to be inserted between the members 3 and 5, the result being that when the several parts are placed in position for fusion their edges will rest one against the other with their end portions resting against the sides of the countersink 2 itself and their intermediate portions spaced slightly above the countersink in a very similar manner to the position occupied by an integral or one-piece button prior to its fusion within a countersink to form the ordinary fused bifocal lens.

The parts having been thus placed together in position it is merely necessary to suitably heat the blank to soften the several parts of the segment and allow the segment to move downward into engagement with and become fusingly united to the major blank 1 to form the fused lens blank shown in section in Fig. VII, the bank being then ground in the usual manner, as indicated in the dotted lines, Fig. VII, with a single continuous curve to produce the finished lens, in this manner in particular differentiating from prior known forms of trifocal or multifocal lenses, requiring the separate grinding of either independent or overlapping countersinks for each different focus and then a subsequent grinding to form the finished lens, whereas by my improved manner of forming the lens I am enabled to construct my improved multifocal lens with the exact desired foci and with but a single grinding to form the countersink and a second single grinding to form the completed lens surface.

While I have particularly described my improved bifocal as formed by the uniting of the several parts as through fusion, it is to be understood that if preferred the several parts of the button or segment as an entirety may be fused together and the button itself cemented in place within the countersink, or if preferred the several parts of the segment itself may be so formed as to properly fit together and be united one to the other by cementing and then the button as an entirety cemented within the countersink without in anywise departing from that feature of my invention relating to the provision of the glass with several different indices of refraction within the single countersink providing the multifocal lens.

I claim:

1. A multifocal lens, comprising an upper distance portion, a reading portion, and a pair of intermediate distance portions disposed one on each side of the reading portion.

2. A multifocal lens, comprising a major portion and a segment, the segment including a central portion of glass of one index of refraction and an outer portion on each side of the central portion having glass of a different index of refraction from both the major blank and the central portion of the segment.

3. A segment for a bifocal lens, comprising a central near vision portion and intermediate distance portions on each side thereof.

4. A multifocal lens, comprising a major portion with a countersink, and a button secured in the countersink, said button having the central portion thereof removed and a portion of a different index of refraction from that of the button substituted for said central portion.

In testimony whereof I affix my signature in the presence of two witnesses.

LUCIAN W. BUGBEE.

Witnesses:
H. K. PARSONS,
E. M. HALVORSEN.